Dec. 6, 1960 A. W. DRAKE 2,962,939
RADIUS AND TAPER CONTROL FOR A DIE SINKING MACHINE
Original Filed Dec. 11, 1956
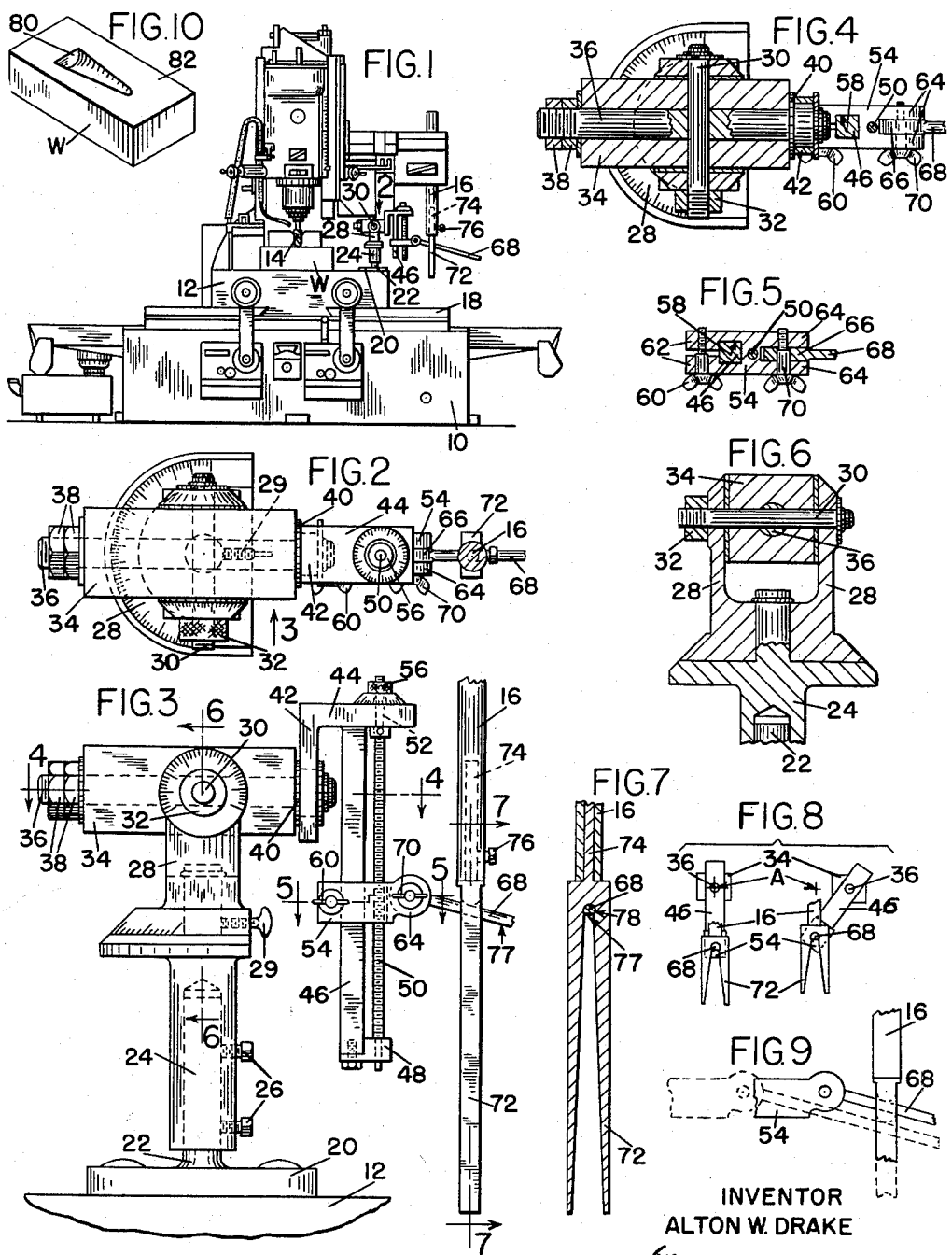
INVENTOR
ALTON W. DRAKE
ATTORNEY

United States Patent Office 2,962,939
Patented Dec. 6, 1960

2,962,939

RADIUS AND TAPER CONTROL FOR A DIE SINKING MACHINE

Alton W. Drake, 40 Alberts St., Auburn, Mass.

Substitute for abandoned application Ser. No. 627,612, Dec. 11, 1956. This application Dec. 28, 1959, Ser. No. 862,417

5 Claims. (Cl. 90—13)

This application is a substitute application for my prior and abandoned application Serial No. 627,612, filed December 11, 1956.

This invention relates to a new and improved adjustable tool control for a die sinking machine, and the principal object of the invention resides in the provision of a relatively simple adjustable device which may be quickly and easily set for cooperation with the tracing arm of a tracing cutter control apparatus for a milling machine to provide a wide variety of radius cuts as for sinking a portion of a cylindrical cavity in a die block, and also for providing a taper therefor.

The objects of the invention also include the provision of a relatively simple adjustable device which is adapted to be mounted upon the worktable of the milling machine and which includes an oscillating arm provided with a new and improved connection with a tracing arm of the tracing cutter control unit, whereby the tracing arm is definitely and accurately controlled by the device as the bed of the milling machine reciprocates; the provision of a connection between the tracing arm aforesaid and the oscillatable member, so that the same are easily separable but cooperate together during the normal reciprocation of the milling machine; and the provision of an angularly adjustable taper bar which ensures not only a radial cut of accurate radius but also provides that said radius cut shall be increased or decreased as the table is indexed in order to provide a tapering semi-conical cavity in the die block.

Other objects and advantages of the invention will appear hereinafter.

Reference is to be had to the accompanying drawings, in which:

Fig. 1 is a view in elevation of the milling machine with the invention applied thereto;

Fig. 2 is a top plan view of the device on an enlarged scale, looking in the direction of arrow 2 in Fig. 1;

Fig. 3 is a side view of the device, looking in the direction of arrow 3 in Fig. 2;

Figs. 4, 5, 6 and 7 are sections on the corresponding lines of Fig. 3;

Figs. 8 and 9 are diagrammatic views illustrating the action of the device; and

Fig. 10 illustrates a cavity which may be formed in a die block.

Referring now to Fig. 1, there is shown a base of a milling machine as at 10 which may be provided with a worktable 12 upon which the work W is secured in any way desired. Means is provided as well known in the art for reciprocating the table 12 under the cutter 14 which is appropriately controlled by a tracing arm 16. The table 12 is of course also indexed as is well known to those skilled in the art so that if a pattern or templet be applied as for instance to the table 12 or to a base therefor as at 18 for cooperation with the arm 16, the cutter 14 will be raised and lowered as the table reciprocates in order to form the die cavity that the operator is to make.

The device of the present invention is best shown in Figs. 2 and 3 and is mounted as for instance by a base 20 on the worktable 12. A standard 22 has mounted thereon in angular and vertical adjustment therewith a sleeve 24 held thereto as by fasteners 26. The standard 24 may be provided with an indexing head 28 which is rotatably mounted thereon on a vertical axis and may be held in position by a fastener 29.

The head 28 may be in the form of a fork or yoke having a rod 30 therethrough, said rod being provided with adjustable tightening means 32 for holding a sleeve 34 in angularly adjusted position about the axis of the rod 30. The sleeve 34 is provided with an axial rod 36 which extends out the ends thereof and at one end is provided with lock nuts 38 and at the other end with a spool or the like 40.

The spool 40 pivotally or oscillatably mounts a bracket 42 having an angular flange 44 thereon. The flange 44 has depending therefrom a square or rectangular rod 46 at the lower end of which is mounted a bearing block 48 for a leadscrew 50. The leadscrew 50 extends upwardly parallel to the rod 46 finding another bearing at 52 in the flange 44.

A carriage 54 is engaged with screw 50 and is translated therealong by rotation of the screw as for instance by means of a thumb-piece 56 thereon. The carriage 54 is provided with a rectangular or square opening 58 accommodating the rod 46 and the fastener 60 may be utilized to clamp a split leg portion 62 (see Fig. 5) in order to secure the carriage in desired position of adjustment along rod 46.

The carriage 54 also has a split leg portion 64 which includes an angularly adjustable head 66 having an elongated taper bar 68 extending therefrom. The head 66, and hence bar 68, is angularly adjustable about the axis of the head 66 and may be secured in adjusted position by a fastener 70.

A fork 72 is provided with a shank 74 which is engaged with tracing arm 16 and is adjustably secured thereto by any means such as a fastener 76. The rod or taper bar 68 is flat on its under surface as at 77 and it snugly but rotatively fits a generally circular opening 78 at the crotch of the fork so that the fork and the taper bar are connected together but may be released by turning the fork relatively to the bar or vice-versa, so that the same may become disengaged therefrom.

It is to be noted that the only motion possible for the tracer arm 16 is an up-and-down vertical motion. The only motion possible of the bar 46 and taper bar 68 is an oscillatory motion on an axis coinciding with that of rod 36. Since the connection between taper bar 68 and the fork 72 is circular, it will be seen that as rod 46 is rotated on the axis of the rod 36, and taper bar 68 rises relative to a fixed horizontal plane and this causes the fork 72 and tracer arm 16 to rise. However, such an action is not possible unless the entire device reciprocates to and from the observer, for instance in Fig. 3. This action of course is provided by the worktable which reciprocates in its normal course of operation.

The relationship between the cutter 14 and the control is such that as the bar 46 is constrained to oscillate about an axis and the cutter 14 is constrained to move up and down in a certain relationship to the work W, a radius will be cut in the work as is perhaps best illustrated as for instance at 80 in Fig. 10.

However, as the device is indexed after each worktable reciprocation, the standard at 22 will move away from the tracer arm 16 and thus the fork and arm 16 move down the incline of the tracer bar 68 and this in turn ensures that the radius becomes greater. In this event, it will be seen that a taper will be cut as indicated at 82 in Fig. 10 rather than a mere semi-cylindrical cavity. If the taper bar is set at horizontal, then there will be no taper cut in the die block, and this taper is reversed merely by pivoting the taper bar 68 upwardly past the horizontal.

It is believed that the construction and operation of the device will be clear from the above description, it being pointed out that as the table reciprocates, the unit described reciprocates also but the taper bar 68 is constrained to remain at its original position at all times except for its up and down motion, carrying with it the fork 72 and thus the control arm 16.

This is shown diagrammatically in Fig. 8 where the rod 36 is shown at the left as at point A with the tracer bar 68 directly under it and in the crotch of the fork. However, when the table has moved forwardly, the rod 36 has moved to the right but the taper bar 68 is still directly beneath point A as it always is so constrained by the fork. However, the fork has been forced to rise and of course it will again sink as the worktable reverses direction and rod 36 once again arrives at point A. The reverse action is of course also true where the table moves to the left rather than to the right.

Whereas in Fig. 8 the diagram shows the device looking from the right toward the device in Figs. 1 and 3, the diagram in Fig. 9 shows the device as it appears in Figs. 1 and 3. That is, in Figs. 1, 3 and 9 the worktable reciprocates to and from the observer and gradually indexes step-by-step to the left. Fig. 9 therefore shows in solid lines for instance, the start of the operation and in dotted lines an intermediate or end of the operation showing how the tracer arm 16 gradually drops due to the downward angle of the tracer bar 68, thus providing a deeper cut and a longer cut to provide the semi-conical cavity of Fig. 10.

Having thus described my invention and the advantages thereof, I do not wish to be limited to the details herein disclosed, otherwise than as set forth in the claims, but what I claim is:

1. In a radius control for machine tool cutter control apparatus including a vertically movable tracer arm controlling a vertically movable cutter member, wherein said machine tool includes a relatively reciprocable worktable member, that improvement comprising a device adapted to be mounted on one of said members to reciprocate therewith, a swingable member on the device mounted on an axis generally normal to the tracer arm, a detachable connection including a taper bar between the swingable member and the tracer arm and swinging in a plane parallel thereto, said swingable member causing vertical reciprocation only of the tracer arm and consequent vertical reciprocation of the tool cutter as the worktable member reciprocates relatively past the same, thereby forming a concave cut in a workpiece on the worktable member, and an element adjustable along the swingable member lengthwise thereof for varying the length of radius of cut, the taper bar being mounted on the adjustable element.

2. The improvement of claim 1 wherein said connection includes a fork secured to the tracer arm, the taper bar being engaged in the crotch of the fork.

3. In a radius and taper control for a machine tool including a reciprocable and indexing worktable, a vertically movable cutter and a vertically movable tracer arm controlling the cutter, that improvement comprising a device for mounting on the worktable for reciprocation and indexing motion therewith, a swinging radius member on the device having an axis generally parallel to the indexing motion and transverse to the reciprocatory motion of the table, a connection between the tracer arm and the swinging member, said connection comprising a taper bar, means mounting the bar on the radius member generally transversely thereof, the bar sliding relative to the tracer arm as the table indexes and the tracer arm being vertically reciprocated as the table reciprocates.

4. The improvement of claim 3 wherein the taper bar is mounted for swinging adjustment relative to the swinging member for varying the degree of taper of cut.

5. The improvement of claim 3 wherein said connection includes an element adjustable along the swinging member, said taper bar being mounted on the element.

References Cited in the file of this patent

UNITED STATES PATENTS 2,800,838　Johnson _____ July 30, 1957

FOREIGN PATENTS 861,044　Germany _____ Dec. 29, 1952